(12) United States Patent
Wakamatsu

(10) Patent No.: US 8,715,831 B2
(45) Date of Patent: May 6, 2014

(54) ONE-COMPONENT MOISTURE CURING ADHESIVE FOR USE IN VEHICLE LIGHTING APPLIANCE AND VEHICLE LIGHTING APPLIANCE USING THE SAME

(75) Inventor: Hiroyuki Wakamatsu, Kanagawa-ken (JP)

(73) Assignee: The Yokohama Rubber Co., Ltd. (JP)

( * ) Notice: Subject to any disclaimer, the term of this patent is extended or adjusted under 35 U.S.C. 154(b) by 179 days.

(21) Appl. No.: 13/220,565

(22) Filed: Aug. 29, 2011

(65) Prior Publication Data

US 2012/0058349 A1   Mar. 8, 2012

(30) Foreign Application Priority Data

Sep. 3, 2010   (JP) ................. 2010-197718

(51) Int. Cl.
*B32B 27/40* (2006.01)
*B32B 27/08* (2006.01)
*C09J 175/08* (2006.01)

(52) U.S. Cl.
USPC ............. 428/423.1; 428/424.8; 525/408

(58) Field of Classification Search
USPC ............. 428/423.1, 424.8; 525/408
See application file for complete search history.

(56) References Cited

U.S. PATENT DOCUMENTS

| 5,550,191 | A | 8/1996 | Hung et al. |
| 5,869,593 | A * | 2/1999 | Helmeke et al. ............... 528/83 |
| 5,939,499 | A | 8/1999 | Anderson et al. |
| 2010/0040894 | A1 * | 2/2010 | Rosenau et al. ............ 428/447 |
| 2010/0249291 | A1 * | 9/2010 | Ichihashi et al. ............ 524/132 |

FOREIGN PATENT DOCUMENTS

| JP | 07-258620 | 10/1995 |
| JP | 2004-137468 | 5/2004 |
| JP | 2009-286883 | 12/2009 |
| JP | 2010-084110 | 4/2010 |

* cited by examiner

*Primary Examiner* — Thao T. Tran
(74) *Attorney, Agent, or Firm* — Thorpe North & Western LLP

(57) ABSTRACT

A one-component moisture curing adhesive for use in a vehicle lighting appliance including: 100 parts by weight of a bifunctional polyether polyol (A) having a molecular weight of not less than 3,000; from 80 to 40 parts by weight of a crystalline polyester polyol (B); from 20 to 60 parts by weight of a non-crystalline polyester polyol (C); a polyisocyanate (D); and a curing catalyst (E), wherein a content of the polyisocyanate (D) is such that a number of isocyanate groups included in the polyisocyanate (D) with respect to a total number of hydroxy groups included in the bifunctional polyether polyol (A), the crystalline polyester polyol (B), and the non-crystalline polyester polyol (C) satisfies NCO/OH=1.2 to 1.5; and a vehicle lighting appliance formed by adhering a lens and a housing the one-component moisture curing adhesive for use in a vehicle lighting appliance.

20 Claims, 3 Drawing Sheets

ONE-COMPONENT MOISTURE CURING ADHESIVE FOR USE IN VEHICLE LIGHTING APPLIANCE AND VEHICLE LIGHTING APPLIANCE USING THE SAME

PRIORITY CLAIM

Priority is claimed to Japan Patent Application Serial No. 2010-197718 filed on Sep. 3, 2010.

BACKGROUND

1. Technical Field

The present technology relates to a one-component moisture curing adhesive for use in a vehicle lighting appliance and a vehicle lighting appliance using the same.

2. Related Art

Conventionally, hot-melt adhesives have been used to adhere lenses and housings in vehicle lighting appliances (e.g. headlamps).

However, in some cases, when a hot-melt adhesive is used to adhere a lens and a housing, a hot strength of the adhered portion (adhesive strength at elevated temperatures) declines.

Japanese Unexamined Patent Application Publication No. 2009-286883A, Japanese Unexamined Patent Application Publication No. 2010-84110A, Japanese Unexamined Patent Application Publication No. 2004-137468A, and Japanese Unexamined Patent Application No. H07-258620A describe examples of reactive hot-melt adhesives.

However, the present inventors discovered that when a reactive hot-melt adhesive is used to adhere a lens and a housing in a vehicle lighting appliance, curing in deep portions is inferior.

SUMMARY

The present technology provides a moisture curing adhesive for use in a vehicle lighting appliance having high hot strength and superior curing in deep portions. As a result of diligent research, the present inventors discovered that it is possible to produce a one-component moisture curing adhesive for use in a vehicle lighting appliance, using a composition including 100 parts by weight of a bifunctional polyether polyol (A) having a molecular weight of not less than 3,000;

from 80 to 40 parts by weight of a crystalline polyester polyol (B);

from 20 to 60 parts by weight of a non-crystalline polyester polyol (C);

a polyisocyanate (D); and a curing catalyst (E), wherein a content of the polyisocyanate (D) is such that a number of isocyanate groups included in the polyisocyanate (D) with respect to a total number of hydroxy groups included in the bifunctional polyether polyol (A), the crystalline polyester polyol (B), and the non-crystalline polyester polyol (C) satisfies NCO/OH=1.2 to 1.5. Thus, the present inventors arrived at the present technology.

Specifically, the present technology provides the following 1 to 7.

1. A one-component moisture curing adhesive for use in a vehicle lighting appliance including: 100 parts by weight of a bifunctional polyether polyol (A) having a molecular weight of not less than 3,000;

from 80 to 40 parts by weight of a crystalline polyester polyol (B);

from 20 to 60 parts by weight of a non-crystalline polyester polyol (C);

a polyisocyanate (D); and a curing catalyst (E), wherein a content of the polyisocyanate (D) is such that a number of isocyanate groups included in the polyisocyanate (D) with respect to a total number of hydroxy groups included in the bifunctional polyether polyol (A), the crystalline polyester polyol (B), and the non-crystalline polyester polyol (C) satisfies NCO/OH=1.2 to 1.5.

2. The one-component moisture curing adhesive for use in a vehicle lighting appliance described in 1, wherein a content of the curing catalyst (E) is from 0.05 to 0.5 wt % with respect to a total of the parts by weight of the bifunctional polyether polyol (A), the crystalline polyester polyol (B), the non-crystalline polyester polyol (C), and the polyisocyanate (D).

3. The one-component moisture curing adhesive for use in a vehicle lighting appliance described in 1 or 2, wherein a total content of the crystalline polyester polyol (B) and the non-crystalline polyester polyol (C) is from 80 to 120 parts by weight per 100 parts by weight of the bifunctional polyether polyol (A).

4. The one-component moisture curing adhesive for use in a vehicle lighting appliance described in any of 1 to 3, wherein a melt viscosity at 120° C. is not less than 10,000 mPa·s.

5. The one-component moisture curing adhesive for use in a vehicle lighting appliance described in any of 1 to 4, wherein the polyisocyanate (D) is 4,4'-diphenylmethane diisocyanate.

6. The one-component moisture curing adhesive for use in a vehicle lighting appliance described in any of 1 to 5, wherein the curing catalyst (E) is 2,2'-dimorpholino diethyl ether.

7. A vehicle lighting appliance formed by adhering a lens and a housing the one-component moisture curing adhesive for use in a vehicle lighting appliance described in any of 1 to 6.

The one-component moisture curing adhesive for use in a vehicle lighting appliance of the present technology has high hot strength and superior curing in deep portions.

The vehicle lighting appliance of the present technology has high hot strength and superior curing in deep portions.

DETAILED DESCRIPTION

Figure 1:
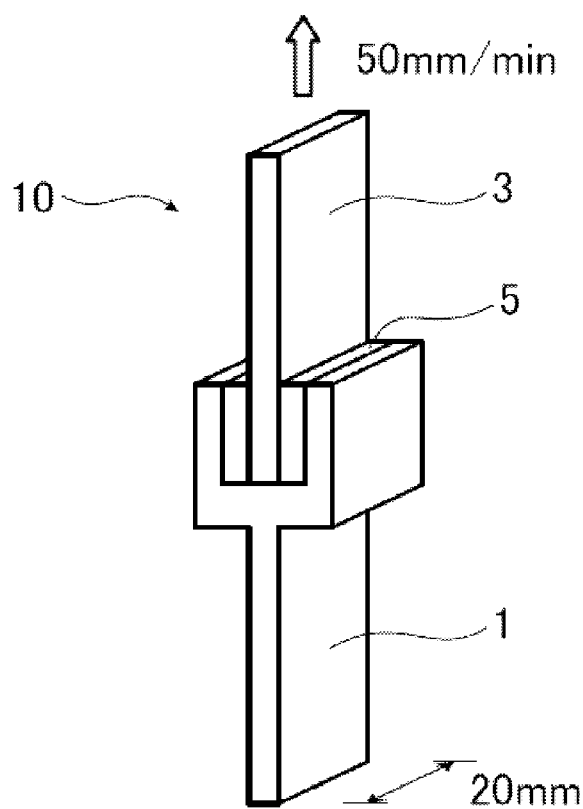
FIG. 1 is a schematic view illustrating a test sample used to evaluate adhesive strength in the Working Examples of the present technology.

The present technology is described in detail below.

A one-component moisture curing adhesive for use in a vehicle lighting appliance of the present technology includes:

100 parts by weight of a bifunctional polyether polyol (A) having a molecular weight of not less than 3,000;

from 80 to 40 parts by weight of a crystalline polyester polyol (B);

from 20 to 60 parts by weight of a non-crystalline polyester polyol (C);

a polyisocyanate (D); and a curing catalyst (E), wherein a content of the polyisocyanate (D) is such that a number of isocyanate groups included in the polyisocyanate (D) with respect to a total number of hydroxy groups included in the bifunctional polyether polyol (A), the crystalline polyester polyol (B), and the non-crystalline polyester polyol (C) satisfies NCO/OH=1.2 to 1.5.

Hereinafter, the one-component moisture curing adhesive for use in a vehicle lighting appliance of the present technology is also referred to as the "adhesive of the present technology."

A description of the bifunctional polyether polyol (A) is given below. A molecular weight of the bifunctional polyether polyol (A) included in the adhesive of the present technology is not less than 3,000. The bifunctional polyether polyol (A) is not particularly limited so long as it is a compound having two hydroxy groups and a polyether skeleton, and the molecular weight thereof is not less than 3,000.

Examples of a backbone of the bifunctional polyether polyol (A) include polyoxyalkylene (e.g. polyoxyethylene and polyoxypropylene) backbones.

From the perspective of being relatively inexpensive and having superior curing in deep portions, the bifunctional polyether polyol (A) is preferably a polypropylene glycol (a polyoxypropylene diol).

In the present technology, the molecular weight of the bifunctional polyether polyol (A) is not less than 3,000. When the molecular weight of the bifunctional polyether polyol (A) is not less than 3,000, curing in deep portions will be superior. From the perspectives of obtaining greater hot strength and superior curing in deep portions, the molecular weight of the bifunctional polyether polyol (A) is preferably from 3,000 to 5,000 and more preferably from 3,000 to 4,000.

A method of producing the bifunctional polyether polyol (A) is not particularly limited. A single bifunctional polyether polyol may be used alone or a combination of two or more bifunctional polyether polyols may be used.

A description of the crystalline polyester polyol (B) is given below. The crystalline polyester polyol (B) included in the adhesive of the present technology is not particularly limited so long as it is a compound having a polyester skeleton and two or more hydroxy groups, and is a solid at 20° C.

The polyester skeleton of the crystalline polyester polyol (B) is not particularly limited. Examples thereof include aliphatic esters (including open chain and cyclo), aromatic esters, and combinations thereof. A method of producing the crystalline polyester polyol (B) is not particularly limited. Examples thereof include production methods wherein a polyol and polycarboxylic acid are condensed, and methods wherein a lactone is ring-opening polymerized. The polyol, polycarboxylic acid, and lactone used when producing the crystalline polyester polyol (B) are not particularly limited. Examples thereof include conventionally known products.

Examples of the crystalline polyester polyol (B) include crystalline polyester polyols and the like formed from at least one selected from the group consisting of adipic acid, sebacic acid, pthalic acid, isophthalic acid, and terephthalic acid as an acidic component; and at least one selected from the group consisting of ethylene glycol, 1,6 hexanediol, and 1,4 butanediol as an alcohol (glycol) component. Among these, from the perspectives of obtaining greater hot strength and superior curing in deep portions, a polyester polyol formed from sebacic acid and hexanediol is preferable.

From the perspectives of obtaining greater hot strength and superior curing in deep portions, the crystalline polyester polyol (B) preferably includes two hydroxy groups.

A single crystalline polyester polyol can be used or a combination of two or more crystalline polyester polyols can be used.

In the present technology, a content of the crystalline polyester polyol (B) is from 80 to 40 parts by weight per 100 parts by weight of the bifunctional polyether polyol (A). When the content is within this range, high hot strength and superior curing in deep portions will be achieved. From the perspectives of obtaining greater hot strength and superior curing in deep portions, the content of the crystalline polyester polyol (B) is preferably from 70 to 40 parts by weight and more preferably from 60 to 40 parts by weight per 100 parts by weight of the bifunctional polyether polyol (A).

A description of the non-crystalline polyester polyol (C) is given below. The non-crystalline polyester polyol (C) included in the adhesive of the present technology is not particularly limited so long as it is a compound having a polyester skeleton and two or more hydroxy groups, and is a liquid at 20° C. The non-crystalline polyester polyol (C) may be amorphous.

The polyester skeleton of the non-crystalline polyester polyol (C) is not particularly limited. Examples thereof include aliphatic esters (including open chain and cyclo), aromatic esters, and combinations thereof. A method of producing the non-crystalline polyester polyol (C) is not particularly limited. Examples thereof include production methods wherein a polyol and polycarboxylic acid is condensed, and methods wherein a lactone is ring-opening polymerized. The polyol, polycarboxylic acid, and lactone used when producing the non-crystalline polyester polyol (C) are not particularly limited. Examples thereof include conventionally known products.

Examples of the non-crystalline polyester polyol (C) include non-crystalline polyester polyols and the like formed from at least one selected from the group consisting of pthalic acid, isophthalic acid, and terephthalic acid as an acidic component; and at least one selected from the group consisting of propylene glycol, 1,3 butanediol, neopentyl glycol, and diethylene glycol as an alcohol (glycol) component. Among these, from the perspectives of obtaining greater hot strength and superior curing in deep portions, a polyester polyol formed from pthalic acid and neopentyl glycol is preferable.

From the perspectives of obtaining greater hot strength and superior curing in deep portions, the non-crystalline polyester polyol (C) preferably includes two hydroxy groups.

A single non-crystalline polyester polyol can be used or a combination of two or more non-crystalline polyester polyols can be used.

In the present technology, a content of the non-crystalline polyester polyol (C) is from 20 to 60 parts by weight per 100 parts by weight of the bifunctional polyether polyol (A). When the content is within this range, high hot strength and superior curing in deep portions will be achieved. From the perspectives of obtaining greater hot strength and superior curing in deep portions, the content of the non-crystalline polyester polyol (C) is preferably from 30 to 60 parts by weight and more preferably from 40 to 60 parts by weight per 100 parts by weight of the bifunctional polyether polyol (A).

From the perspectives of obtaining greater hot strength and superior curing in deep portions, a total content of the crystalline polyester polyol (B) and the non-crystalline polyester polyol (C) is preferably from 80 to 120 parts by weight and more preferably from 80 to 100 parts by weight per 100 parts by weight of the bifunctional polyether polyol (A).

A description of the polyisocyanate (D) is given below. The polyisocyanate (D) included in the adhesive of the present technology is not particularly limited so long as it is a compound having two or more isocyanate groups. Examples thereof include aliphatic polyisocyanates (including open chain aliphatic polyisocyanates and alicyclic polyisocyanates), aromatic polyisocyanates, and combinations thereof.

From the perspectives of obtaining greater hot strength and superior curing in deep portions, the polyisocyanate (D) is preferably an aliphatic polyisocyanate and/or an aromatic polyisocyanate, and more preferably is an aromatic polyisocyanate.

Examples of the aromatic polyisocyanate include diphenylmethane diisocyanate (MDI), diphenyl diisocyanate, toluene diisocyanate (TDI), xylylene diisocyanate, and tetramethylxylylene diisocyanate. Among these, from the perspectives of obtaining greater hot strength, MDI and/or polymeric MDI are preferable, and 4,4'-diphenylmethane diisocyanate is more preferable. A single polyisocyanate can be used or a combination of two or more polyisocyanates can be used.

In the present technology, a content of the polyisocyanate (D) is such that a number of isocyanate groups included in the polyisocyanate (D) with respect to a total number of hydroxy groups included in the bifunctional polyether polyol (A), the crystalline polyester polyol (B), and the non-crystalline polyester polyol (C) satisfies NCO/OH=1.2 to 1.5. When the content of the polyisocyanate (D) is within this range, a viscosity of the adhesive can be set to be within a satisfactory range (e.g. to a melt viscosity of the adhesive described below). From the perspectives of obtaining greater hot strength, superior curing in deep portions, and a satisfactory viscosity of the adhesive, the content of the polyisocyanate (D) is preferably such that NCO/OH, as described above, is from 1.2 to 1.4, and more preferably such that NCO/OH is from 1.2 to 1.3.

A description of the curing catalyst (E) is given below. The curing catalyst (E) included in the adhesive of the present technology is not particularly limited so long as it can be used as a catalyst in reacting the isocyanate groups with the hydroxy groups or water. Examples thereof include conventionally known products. Among these, from the perspectives of obtaining greater hot strength and superior curing in deep portions, a compound having a morpholine ring is preferable; morpholine, 1-(4-morpholino)cyclohexene, 1-morpholino cyclopentene, 2-(N-morpholino)ethanesulfonic acid, 2,2'-dimorpholino diethyl ether, di(2,6-dimethyl morpholinoethyl) ether, and di(2,6-diethyl morpholinoethyl)ether are more preferable; and 2,2'-dimorpholino diethyl ether is even more preferable. A single curing catalyst can be used or a combination of two or more curing catalysts can be used.

From the perspectives of obtaining greater hot strength and superior curing in deep portions, a content of the curing catalyst (E) is preferably from 0.05 to 0.5 wt % with respect to a total of the parts by weight of the bifunctional polyether polyol (A), the crystalline polyester polyol (B), the non-crystalline polyester polyol (C), and the polyisocyanate (D) (from 0.05 to 0.5 wt % of the sum of (A), (B), (C), and (D)), and more preferably from 0.1 to 0.3 wt %.

As necessary, the adhesive of the present technology can further include additives. Examples of the additives include antiaging agents, antioxidants, UV absorbing agents, colorants such as pigments and dyes, fillers, softeners, plasticizers, and reinforcing agents. Contents of the additives can be adjusted as desired.

A method of producing the adhesive of the present technology is not particularly limited. Examples thereof include production methods wherein the components (A) to (E) and the additives that can be added as necessary are mixed.

The adhesive of the present technology can be formed into a one-component adhesive.

From the perspective of preventing the adhesive of the present technology from flowing out of a groove of the housing when orienting the housing vertically after the adhesive has been applied to said groove, a melt viscosity at 120° C. is preferably not less than 10,000 mPa·s, and is more preferably from 20,000 to 50,000 mPa·s. In the present technology, the melt viscosity of the adhesive at 120° C. was measured using a BH viscometer (#7 spindle; speed of rotation=2 rpm) at 120° C.

The adhesive of the present technology can be moisture cured.

Examples of methods of use of the adhesive of the present technology include applying the composition of the present technology, being heated to a temperature of from 110 to 130° C. and melted, to an adherend (e.g. a first member and/or a second member). A texture of the second member may be the same or different from that of the first member. Examples of methods for curing the adhesive of the present technology include methods wherein a joined body is formed by joining the first member and the second member, and cured using moisture in the atmosphere at room temperature.

Examples of the adherend to which the adhesive of the present technology can be applied include plastic (e.g. polyolefin, polycarbonate, and (meth)acrylic resin), wood, and rubber.

Examples of methods for applying the compositions of the present technology to the adherend include methods using discharging devices.

The adhesive of the present technology can be used as an adhesive for use in vehicle lighting appliances, and can be applied to bond a lens and a housing of a lamp of an automobile (e.g. a headlamp, a rear combination lamp, or the like) and can be applied to a seal portion of a lens of a vehicle lighting appliance.

A description of the vehicle lighting appliance of the present technology is given below.

The vehicle lighting appliance of present technology is a vehicle lighting appliance formed by bonding a lens and a housing the one-component moisture curing adhesive for use in a vehicle lighting appliance of the present technology.

Figure 2:
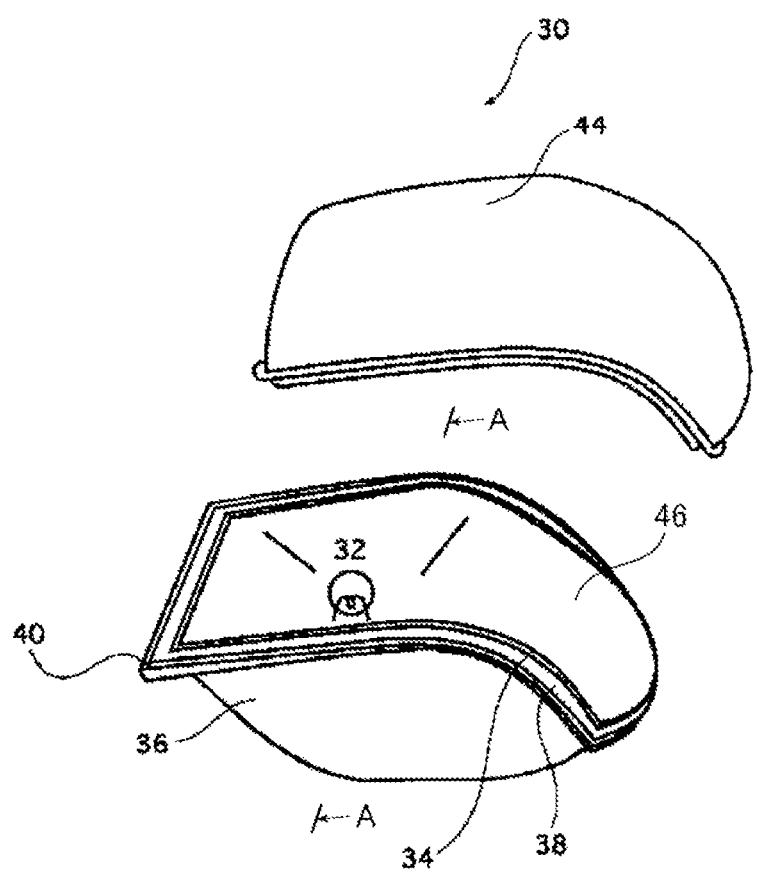
FIG. 2 is a perspective view schematically illustrating an example of a vehicle lighting appliance of the present technology.

A description of the vehicle lighting appliance of the present technology is given below while referring to the attached drawings. However, the present technology is not limited to the drawings. FIG. 2 is a perspective view schematically illustrating an example of a vehicle lighting appliance of the present technology. In FIG. 2, a vehicle lighting appliance 30 is integrally formed from a light source 32; a housing 36 that holds the light source 32 in a predetermined position and houses a reflector 46, on an inner surface, that acts as a reflecting mirror and reflects light forward; and a lens 44 that closes an open face of the housing 36 and modulates the light. An outward protruding flange 40 and an edge portion 34 are formed throughout an entire periphery of an upper end of the housing 36 on the open face side. A groove-like seal portion 38 is formed between the flange 40 and the edge portion 34. Preheated adhesive (not illustrated) is applied to the seal portion 38 and the lens 44 is joined thereto. The adhesive is cured and the housing 36 and the lens 44 are bonded.

Figure 3A:
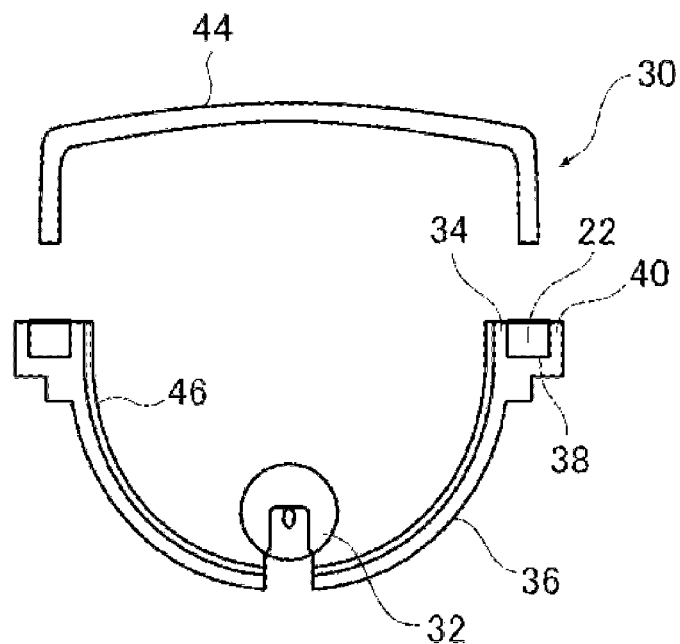
FIGS. 3A and 3B are cross-sectional views schematically illustrating an example of a vehicle lighting appliance of the present technology.
Figure 3B:
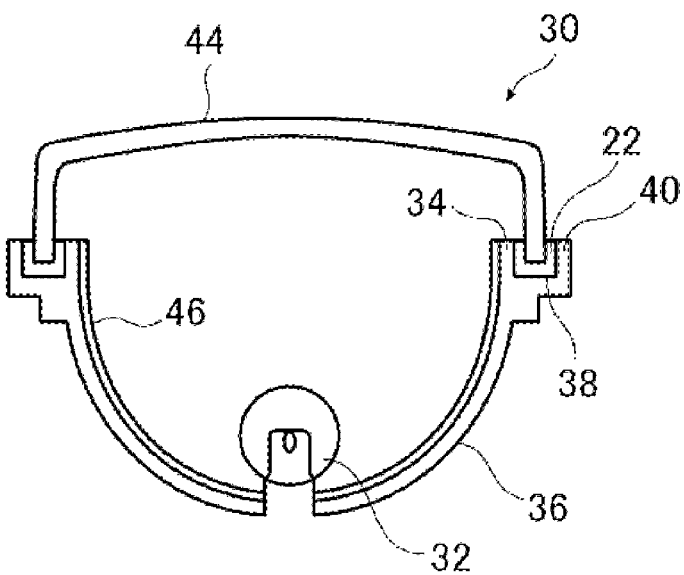

FIGS. 3A and 3B are perspective views schematically illustrating an example of a vehicle lighting appliance of the present technology. FIG. 3A is a cross-sectional view taken along A-A of FIG. 2. In FIG. 3A, an adhesive 22 is applied to the seal portion 38. FIG. 3B is a cross-sectional view of a vehicle lighting appliance wherein the housing 36 and the lens 44 of FIG. 3A have been integrated. In FIG. 3B, the vehicle lighting appliance 30 is formed wherein an edge portion of the lens 44 (not illustrated) is embedded in the seal portion 38 of the housing 36 and the adhesive 22 is cured.

Materials of the lens and the housing used in the vehicle lighting appliance of the present technology are not particularly limited. Examples of the material of the lens include transparent resins such as polycarbonate, (meth)acrylic resins (e.g. PMMA), glass, and the like. Examples of the material of the housing include polyolefins such as polypropylene. The housing may be plasma treated. An example of a preferable form of the housing is one in which the housing is plasma treated.

The adhesive used in the vehicle lighting appliance of the present technology is not particularly limited so long as it is the adhesive of the present technology.

Methods of use of the adhesive and methods of applying the adhesive to the adherend (e.g. the lens and/or the housing) are the same as described above.

Conventionally, reactive hot-melt compositions have been used as adhesives on planar (e.g. sheet-like and plate-like) adherends. In these cases, there was no need for curing in deep portions, as the adhesive layer was thin.

However, when used as a one-component moisture curing adhesive for use in a vehicle lighting appliance, reactive hot-melt compositions need curing in deep portions as the adhesive is applied to a groove. The present inventors discovered that curing in deep portions with conventional reactive hot-melt compositions is inferior. As a result of continued research, the present inventors discovered that the adhesive of the present technology displayed superior curing in deep portions.

Additionally, in recent years, vehicle lighting appliances have become increasingly oblong in shape. When an adhesive is applied to such an oblong vehicle lighting appliance, the adhesive drips down, resulting in a reduced thickness at the top and an increased thickness at the bottom. This leads to a problem of non-uniform bonding. The content of the polyisocyanate (D) in adhesive of the present technology is such that the number of isocyanate groups included in the polyisocyanate (D) with respect to a total number of hydroxy groups included in the bifunctional polyether polyol (A), the crystalline polyester polyol (B), and the non-crystalline polyester polyol (C) satisfies NCO/OH=1.2 to 1.5. Therefore, a satisfactory viscosity of the adhesive (the melt viscosity, particularly the melt viscosity at 120° C.) can be obtained.

EXAMPLES

The present technology is described below in detail using working examples but the present technology is not limited to such working examples.

Production of the Adhesive

The adhesive composition was uniformly synthesized using the amounts (shown in Table 1) of the constituents (also shown in Table 1) in a reaction vessel provided with temperature control features, a nitrogen sparge tube, a pressure reducing device, and an agitator.

Evaluation

The adhesive obtained as described above was evaluated for the following criteria. The results are shown in Table 1.

1. Viscosity

Melt viscosity of the adhesive at 120° C. was measured using a BH viscometer. A lower melt viscosity at 120° C. was evaluated to indicate less dripping.

2. Adhesive Strength

A description of the adhesive strength evaluated in the Working Examples of the present technology is given below while referring to the attached drawings. FIG. 1 is a schematic view illustrating a test sample used to evaluate adhesive strength in the Working Examples of the present technology. In FIG. 1, a test sample 10 has a polypropylene member 1 (corresponding to the housing), a plate-like polycarbonate member 3 with a length of 55 mm, a width of 20 mm, and a thickness of 2 mm (corresponding to the lens), and an adhesive 5. The (plasma treated) polypropylene member 1 has a groove portion (groove depth=7 mm, groove width=5 mm, groove length=20 mm; not illustrated). Using a hand applicator, the adhesive 5, preheated to 120° C. and melted, was applied to the groove portion of the polypropylene member 1. Thereafter, the polycarbonate member 3 was inserted into a center of the groove portion of the polypropylene member 1, and the edge of the polycarbonate member 3 (not illustrated) was brought into contact with the bottom of the groove portion of the polypropylene member 1 (not illustrated). Thus, the test sample 10 was obtained.

The obtained test sample 10 was cured by allowing it to sit for 21 days at 20° C. and 55% RH. After the curing, an adhesive strength (N) of the test sample 10 was measured under the following conditions: Pulling speed=50 mm/minute; Temperature when the pulling speed was measured=20° C. or 80° C. The adhesive strength of the test sample 10 after curing, when the temperature at which the pulling speed was measured was 80° C., corresponds to the hot strength.

3. Curing in Deep Portions

The adhesive obtained as described above was heated to 120° C. and melted. Then, a joint made from aluminum foil having a U-shaped cross-section, a width of 15 mm, a depth of 6 mm, and a length of 150 mm (here, the joint is a container-like object having the dimensions described above) was filled with the adhesive. Thereafter, the adhesive was cured by allowing it to sit for seven days at 20° C. and 55% RH. Thus, a sample was obtained. After the curing, the obtained sample was cut at the center of the 150 mm length so that an aluminum foil cross-section was a U-shape having a width of 15 mm and a depth of 6 mm. A cut face of the cut sample was oriented so as to be downward and was allowed to sit for two hours at 120° C. Then, the uncured adhesive was removed. After heating to 120° C., a thickness of the (cured) adhesive in the cut sample that did not melt when heated to 120° C. was measured from a surface thereof.

TABLE 1-1

|  |  |  | Working Examples | | | | | |
|---|---|---|---|---|---|---|---|---|
|  |  |  | 1 | 2 | 3 | 4 | 5 | 6 |
| Polyether polyol 1 | EXL1020 | PPG OHV: 112 MW1000 | | | | | | |

TABLE 1-1-continued

| | | | Working Examples | | | | | |
|---|---|---|---|---|---|---|---|---|
| | | | 1 | 2 | 3 | 4 | 5 | 6 |
| Polyether polyol 2 | EXL2020 | PPG OHV: 56 MW2000 | | | | | | |
| Polyether polyol 3 | EXL3020 | PPG OHV: 35 MW3200 | 100 | 100 | 100 | 100 | | |
| Polyether polyol 4 | EXL510 | PPG OHV: 28 MW4000 | | | | | 100 | 100 |
| Crystalline polyester polyol | HS2H-200S | SA/HD OHV: 58 MW2000 | 40 | 80 | 40 | 40 | 40 | 80 |
| Non-crystalline polyester polyol | HS2F-136P | PA/NPG OHV: 113 MW1000 | 60 | 20 | 60 | 60 | 60 | 20 |
| Polyisocyanate | MDI (Millionate ® MT) | | 35.7 | 29.5 | 58.5 | 35.7 | 33.7 | 27.2 |
| IND (NCO/OH) | | | 1.25 | 1.25 | 1.35 | 1.25 | 1.25 | 1.25 |
| Curing catalyst | DMDEE (UCAT660M) | | 0.24 | 0.24 | 0.24 | 1.5 | 0.24 | 0.24 |
| Composition total | | | 235.94 | 229.74 | 258.74 | 237.2 | 233.94 | 227.44 |
| Curing catalyst content (wt %) | | | 0.10% | 0.10% | 0.09% | 0.63% | 0.10% | 0.11% |
| NCO % | | | 1.01 | 0.86 | 1.39 | 1.01 | 0.91 | 0.75 |
| Viscosity (120° C.) mPa·s | | | 43000 | 40000 | 20000 | 43000 | 45000 | 40000 |
| Adhesive strength Curing conditions: 20° C., 55% RH, 21 days | Unit (N) Measurement temperature | 20° C. 80° C. | 860 160 | 920 115 | 950 150 | 860 160 | 830 150 | 800 120 |
| Curing in deep portions Unit (mm) Curing conditions: 20° C., 55% RH, 7 days | | | 4.5 | 5.0 | 4.1 | 4.5 | 5.0 | 6.0 |

TABLE 1-2

| | | | Comparative Examples | | | | | |
|---|---|---|---|---|---|---|---|---|
| | | | 1 | 2 | 3 | 4 | 5 | 6 |
| Polyether polyol 1 | EXL1020 | PPG OHV: 112 MW1000 | 100 | | | | | |
| Polyether polyol 2 | EXL2020 | PPG OHV: 56 MW2000 | | 100 | | | | |
| Polyether polyol 3 | EXL3020 | PPG OHV: 35 MW3200 | | | 100 | 100 | 100 | 100 |
| Polyether polyol 4 | EXL510 | PPG OHV: 28 MW4000 | | | | | | |
| Crystalline polyester polyol | HS2H-200S | SA/HD OHV: 58 MW2000 | 40 | 40 | 100 | | 20 | 90 |
| Non-crystalline polyester polyol | HS2F-136P | PA/NPG OHV: 113 MW1000 | 60 | 60 | | 100 | 80 | 10 |
| Polyisocyanate | MDI (Millionate ® MT) | | 56.6 | 41 | 26.4 | 42.6 | 39.4 | 28.0 |
| IND (NCO/OH) | | | 1.25 | 1.25 | 1.25 | 1.25 | 1.25 | 1.25 |
| Curing catalyst | DMDEE (UCAT660M) | | 0.24 | 0.24 | 0.24 | 0.24 | 0.24 | 0.24 |
| Composition total | | | 256.84 | 241.24 | 226.64 | 242.84 | 239.64 | 228.24 |
| Curing catalyst content (wt %) | | | 0.09% | 0.10% | 0.11% | 0.10% | 0.10% | 0.11% |
| NCO % | | | 1.47 | 1.13 | 0.71 | 1.13 | 1.05 | 0.72 |
| Viscosity (120° C.) mPa·s | | | 41000 | 41000 | 30000 | 70000 | 60000 | 36000 |
| Adhesive strength Curing conditions: 20° C., 55% RH, 21 days | Unit (N) Measurement temperature | 20° C. 80° C. | 850 130 | 920 110 | 980 90 | 980 180 | 900 170 | 850 95 |

TABLE 1-2-continued

|  | Comparative Examples | | | | | |
| --- | --- | --- | --- | --- | --- | --- |
|  | 1 | 2 | 3 | 4 | 5 | 6 |
| Curing in deep portions Unit (mm) Curing conditions: 20° C., 55% RH, 7 days | 2.5 | 3.5 | 5.0 | 2.5 | 3.0 | 5.5 |

Detailed descriptions of the components shown in Table 1 are given in Table 1 and below.

Polyether polyol 1: Bifunctional polypropylene glycol; Excenol® 1020, manufactured by Asahi Glass Co., Ltd.; Molecular weight=1,000

Polyether polyol 2: Bifunctional polypropylene glycol; Excenol® 2020, manufactured by Asahi Glass Co., Ltd.; Molecular weight=2,000

Polyether polyol 3: Bifunctional polypropylene glycol; Excenol® 3020, manufactured by Asahi Glass Co., Ltd.; Molecular weight=3,200

Polyether polyol 4: Bifunctional polypropylene glycol; Excenol® 510, manufactured by Asahi Glass Co., Ltd.; Molecular weight=4,000

Crystalline polyester polyol: Polyester diol of sebacic acid and hexanediol; HS2H-200S, manufactured by Hokoku Co., Ltd.; Molecular weight=2,000

Non-crystalline polyester polyol: Polyester diol of pthalic acid and neopentyl glycol; HS2F-136P, manufactured by Hokoku Co., Ltd.; Molecular weight=1,000

Polyisocyanate: MDI (4,4'-diphenylmethane diisocyanate); Millionate® MT, manufactured by Nippon Polyurethane Industry Co., Ltd.

Curing catalyst: DMDEE (2,2'-dimorpholino diethyl ether); UCAT660M, manufactured by San-Apro Ltd.

As is clear from the results shown in Table 1, curing in deep portions was inferior in Comparative Examples 1 and 2 wherein the weight-average molecular weight of the polyether polyol was less than 3,000. Hot strength was inferior in Comparative Example 3 wherein the non-crystalline polyester polyol (C) was not included. Curing in deep portions was inferior in Comparative Example 4 wherein the crystalline polyester polyol (B) was not included. Curing in deep portions was inferior in Comparative Example 5 wherein the content of the crystalline polyester polyol (B) was less than 40 parts by weight and the content of the non-crystalline polyester polyol (C) exceeded 60 parts by weight. Hot strength was inferior in Comparative Example 6 wherein the content of the crystalline polyester polyol (B) exceeded 80 parts by weight and the content of the non-crystalline polyester polyol (C) was less than 20 parts by weight.

In contrast, in Working Examples 1 to 6 high hot strength was obtained and curing in deep portions was superior. Curing in deep portions was particularly superior in Working Example 6 wherein the molecular weight of the bifunctional polyether polyol (A) was from 3,000 to 4,000.

Thus, the adhesive of the present technology displays high hot strength and superior curing in deep portions, a rapid curing rate, superior heat resistance, dripping prevention characteristics at elevated temperatures, and excellent workability. Moreover, the adhesive of the present technology displays superior productivity, as there is no need to provide the vehicle lighting appliance with a fastener such as a lance.

What is claimed is:

1. A one-component moisture curing adhesive for use in a vehicle lighting appliance comprising: 100 parts by weight of a bifunctional polyether polyol (A) having a molecular weight of not less than 3,000;
   from 80 to 40 parts by weight of a crystalline polyester polyol (B) per 100 parts by weight of the bifunctional polyether polyol (A);
   from 20 to 60 parts by weight of a non-crystalline polyester polyol (C) per 100 parts by weight of the bifunctional polyether polyol (A), wherein the non-crystalline polyester polyol (C) is formed from pthalic acid and neopentyl glycol;
   a polyisocyanate (D); and
   a curing catalyst (E), wherein
   a content of the polyisocyanate (D) is such that a number of isocyanate groups included in the polyisocyanate (D) with respect to a total number of hydroxy groups included in the bifunctional polyether polyol (A), the crystalline polyester polyol (B), and the non-crystalline polyester polyol (C) satisfies NCO/OH=1.2 to 1.5.

2. The one-component moisture curing adhesive for use in a vehicle lighting appliance according to claim 1, wherein a content of the curing catalyst (E) is from 0.05 to 0.5 wt % with respect to a total of the parts by weight of the bifunctional polyether polyol (A), the crystalline polyester polyol (B), the non-crystalline polyester polyol (C), and the polyisocyanate (D).

3. The one-component moisture curing adhesive for use in a vehicle lighting appliance according to claim 1, wherein a total content of the crystalline polyester polyol (B) and the non-crystalline polyester polyol (C) is from 80 to 120 parts by weight per 100 parts by weight of the bifunctional polyether polyol (A).

4. The one-component moisture curing adhesive for use in a vehicle lighting appliance according to claim 1, wherein a melt viscosity at 120° C. is not less than 10,000 mPa·s.

5. The one-component moisture curing adhesive for use in a vehicle lighting appliance according to claim 1, wherein the polyisocyanate (D) is 4,4'-diphenylmethane diisocyanate.

6. The one-component moisture curing adhesive for use in a vehicle lighting appliance according to claim 1, wherein the curing catalyst (E) is 2,2'-dimorpholino diethyl ether.

7. The one-component moisture curing adhesive for use in a vehicle lighting appliance according to claim 1, wherein the bifunctional polyether polyol (A) is a polypropylene glycol.

8. The one-component moisture curing adhesive for use in a vehicle lighting appliance according to claim 1, wherein the bifunctional polyether polyol (A) has a molecular weight of from 3,000 to 4,000.

9. The one-component moisture curing adhesive for use in a vehicle lighting appliance according to claim 1, wherein the crystalline polyester polyol (B) is formed from sebacic acid and hexanediol.

10. The one-component moisture curing adhesive for use in a vehicle lighting appliance according to claim 1, wherein the crystalline polyester polyol (B) comprises two hydroxy groups.

11. The one-component moisture curing adhesive for use in a vehicle lighting appliance according to claim 1, comprising from 60 to 40 parts by weight of a crystalline polyester polyol (B) per 100 parts by weight of the bifunctional polyether polyol (A).

12. The one-component moisture curing adhesive for use in a vehicle lighting appliance according to claim 1, comprising from 40 to 60 parts by weight of the non-crystalline polyester polyol (C) per 100 parts by weight of the bifunctional polyether polyol (A).

13. The one-component moisture curing adhesive for use in a vehicle lighting appliance according to claim 1, wherein a total content of the crystalline polyester polyol (B) and the non-crystalline polyester polyol (C) is from 80 to 100 parts by weight per 100 parts by weight of the bifunctional polyether polyol (A).

14. The one-component moisture curing adhesive for use in a vehicle lighting appliance according to claim 1, wherein the polyisocyanate (D) is an aromatic polyisocyanate.

15. The one-component moisture curing adhesive for use in a vehicle lighting appliance according to claim 1, wherein the content of the polyisocyanate (D) is such that a number of isocyanate groups included in the polyisocyanate (D) with respect to a total number of hydroxy groups included in the bifunctional polyether polyol (A), the crystalline polyester polyol (B), and the non-crystalline polyester polyol (C) satisfies NCO/OH=1.2 to 1.3.

16. The one-component moisture curing adhesive for use in a vehicle lighting appliance according to claim 1, wherein a content of the curing catalyst (E) is from 0.1 to 0.3 wt % with respect to a total of the parts by weight of the bifunctional polyether polyol (A), the crystalline polyester polyol (B), the non-crystalline polyester polyol (C), and the polyisocyanate (D).

17. The one-component moisture curing adhesive for use in a vehicle lighting appliance according to claim 1, wherein a melt viscosity of the adhesive at 120° C. is from 20,000 to 50,000 mPa·s.

18. The one-component moisture curing adhesive for use in a vehicle lighting appliance according to claim 1, wherein an adhesive strength at a temperature of 80° C. is at least 115 N after curing conditions of 20° C. at 55% RH for 21 days, and a curing depth is at least 4.1 mm as measured from a surface of the adhesive after curing conditions of 20° C. at 55% RH for 7 days.

19. A vehicle lighting appliance formed by adhering a lens and a housing the one-component moisture curing adhesive for use in a vehicle lighting appliance described in claim 1.

20. The vehicle lighting appliance of claim 19, wherein the housing is a plasma treated housing comprising polypropylene.

* * * * *